(12) United States Patent
Liu et al.

(10) Patent No.: US 7,852,057 B2
(45) Date of Patent: Dec. 14, 2010

(54) DC-DC CONVERTER

(75) Inventors: Shiue Shin Liu, HsinChu (TW);
Tse-Hsiang Hsu, Hsin-Chu (TW)

(73) Assignee: Mediatek Inc., Hsin-Chu (TW)

( * ) Notice: Subject to any disclaimer, the term of this patent is extended or adjusted under 35 U.S.C. 154(b) by 467 days.

(21) Appl. No.: 11/865,765

(22) Filed: Oct. 2, 2007

(65) Prior Publication Data

US 2009/0085532 A1 Apr. 2, 2009

(51) Int. Cl.
*G05F 1/40* (2006.01)
(52) U.S. Cl. ..................................................... 323/283
(58) Field of Classification Search ................. 323/222, 323/223, 225, 268, 271, 282, 283, 285, 349–251
See application file for complete search history.

(56) References Cited

U.S. PATENT DOCUMENTS

| | | | | |
|---|---|---|---|---|
| 5,943,227 A | * | 8/1999 | Bryson et al. ................. | 363/95 |
| 6,833,691 B2 | * | 12/2004 | Chapuis ....................... | 323/283 |
| 6,842,353 B2 | * | 1/2005 | Yamada et al. ................ | 363/89 |
| 7,119,525 B1 | * | 10/2006 | Yoshino ....................... | 323/283 |
| 7,167,054 B1 | * | 1/2007 | Dening et al. ............... | 330/297 |
| 2006/0091871 A1 | | 5/2006 | Abedinpour et al. | |

* cited by examiner

*Primary Examiner*—Matthew V Nguyen
(74) *Attorney, Agent, or Firm*—Thomas, Kayden, Horstemeyer & Risley

(57) ABSTRACT

A DC-DC converter providing a DC output voltage at an output node. The DC-DC converter comprises an output stage, a digital controller, and a controller. The output stage comprises a pull-up circuit having a control terminal and coupled between a first fixed voltage and a internal node, a pull-down circuit coupled between the internal node and a second fixed voltage, and a low pass filter coupled between the internal node and the output node. The digital controller is powered by the DC output voltage and adjusts the DC output voltage by controlling the output stage. The controller controls a connection of a feedback path, comprising the digital controller, between the output node and the control terminal according to the DC output voltage.

12 Claims, 6 Drawing Sheets

DC-DC CONVERTER

BACKGROUND

The invention relates to a DC-DC converter and, in particular, to a Buck converter.

Often space limitations in a device do not allow multiple batteries to supply different parts of the device. As a result, DC to DC converters are important in mobile devices such as cellular phones and laptop computers receiving power from batteries.

Efficiency is a major concern in DC-DC converter design. DC-DC converters with a digital control loop are popular because of flexibility. With programmable gain and loop bandwidth, it is easy to program the DC-DC converter according to different LC filters or switching frequencies, etc.

FIG. 1 is a schematic diagram of a conventional DC-DC converter with a digital control loop. The DC-DC converter comprises an output stage and a digital controller. The output stage comprises a PMOS transistor, an NMOS transistor, and an LC filter. The PMOS and NMOS transistors are series connected between a power supply PVDD and a ground PGND. The LC filter comprises an inductor, coupled between a common drain of the PMOS and NMOS transistors and an output node of the DC-DC converter, and a capacitor, coupled between the output node and the ground PGND. The output voltage of the output node is sampled by a voltage divider, such as a resistor in FIG. 1. The digital converter comprises an A/D converter and a digital control circuit powered by a digital power supply DVDD. The A/D converter is coupled to the voltage divider and receives the sampled output voltage. The sampled output voltage is converted to a digital control code and transmitted to the digital control circuit. The digital control circuit controls switching of the PMOS and NMOS transistors according to the digital control code.

One problem with this DC-DC converter is that power for digital and analog circuits in an integrated circuit is typically supplied by different sources. For example, in a device powered by a lithium-base battery, a voltage of 1.8V, for system digital power, down-converted from 3V is often required. While 3V power the analog circuit in DC converter, the digital controller requires 1.8V and cannot be directly connected to the battery. This problem can be eliminated using an additional low dropout regulator to provide digital power, as shown in FIG. 2. However, efficiency for LDO depends on the output voltage to battery voltage ratio, resulting in efficiency loss and increased chip area.

SUMMARY

A DC-DC converter provides a DC output voltage at an output node. The DC-DC converter comprises a output stage, a digital controller, and a controller. The output stage comprises a pull-up circuit having a control terminal and coupled between a first fixed voltage and an internal node, a pull-down circuit coupled between the internal node and a second fixed voltage, and a low pass filter coupled between the internal node and the output node. The digital controller is powered by the DC output voltage and adjusts the DC output voltage by controlling the output stage. The controller controls a connection of a feedback path, comprising the digital controller, between the output node and the control terminal according to the DC output voltage.

A DC-DC converter provides a DC output voltage at an output node. The DC-DC converter comprises an output stage, a current control circuit, and a controller. The output stage comprises a pull-up circuit having a control terminal and coupled between a first fixed voltage and an internal node, a pull-down circuit coupled between the internal node and a second fixed voltage, and a low pass filter coupled between the internal node and the output node. The current control circuit is selectively coupled to the pull-up circuit and controls current through the pull-up circuit. The controller selectively connects the current control circuit to the pull-up circuit according to the DC output voltage.

DETAILED DESCRIPTION

Figure 1:
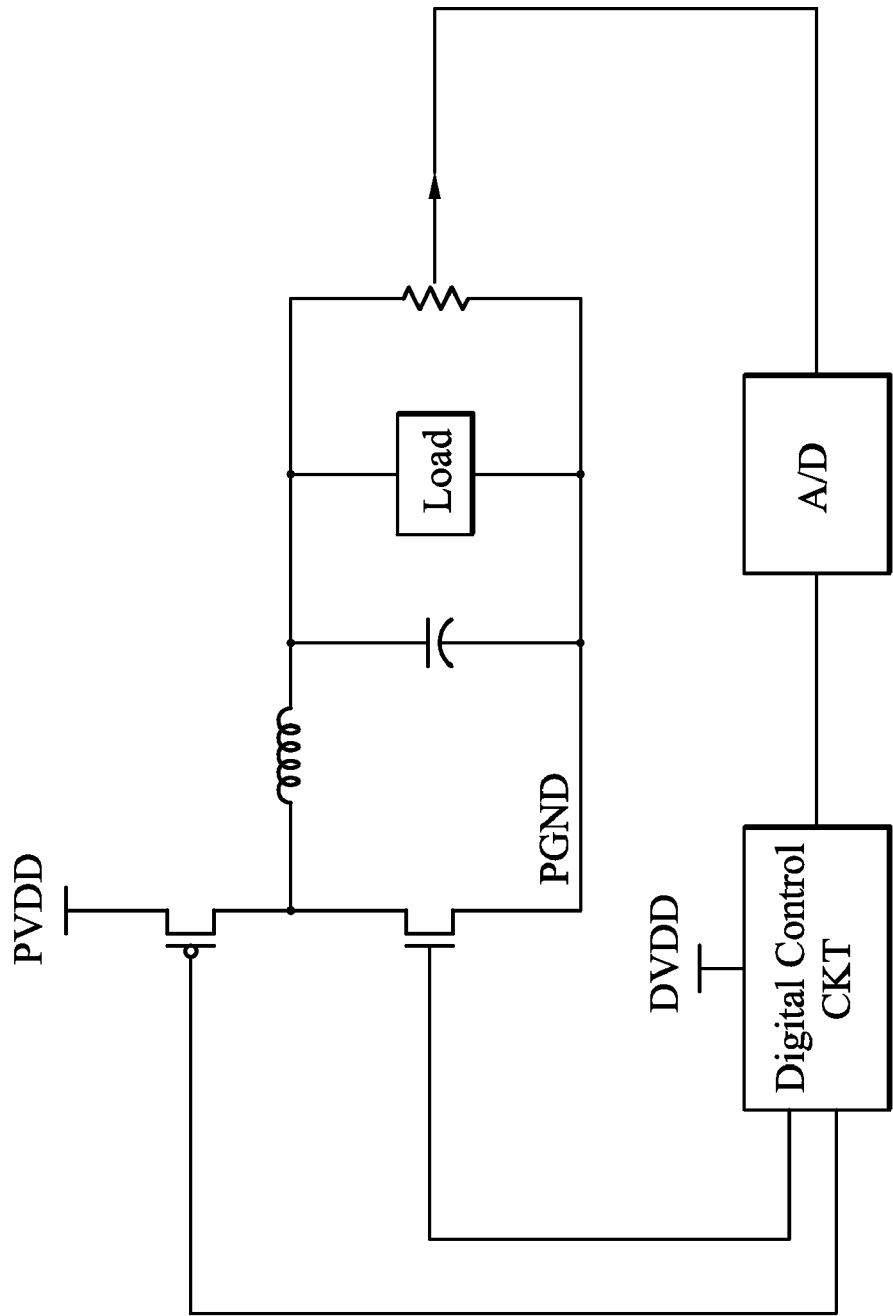
FIG. 1 is a schematic diagram of a conventional DC-DC converter with a digital control loop.
Figure 2:
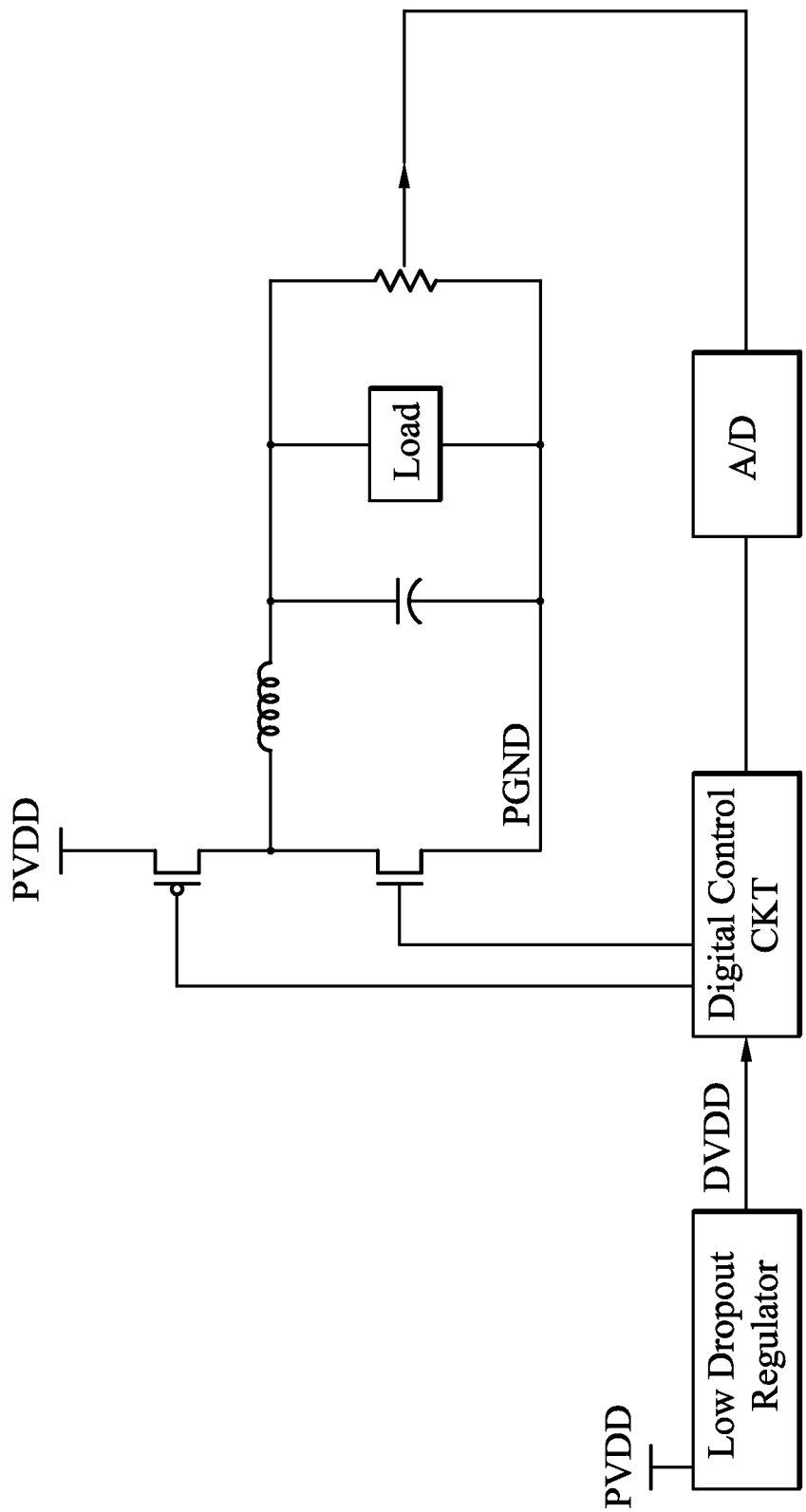
FIG. 2 is a schematic diagram of a conventional DC-DC converter modified from the DC-DC converter in FIG. 1.
Figure 3A:
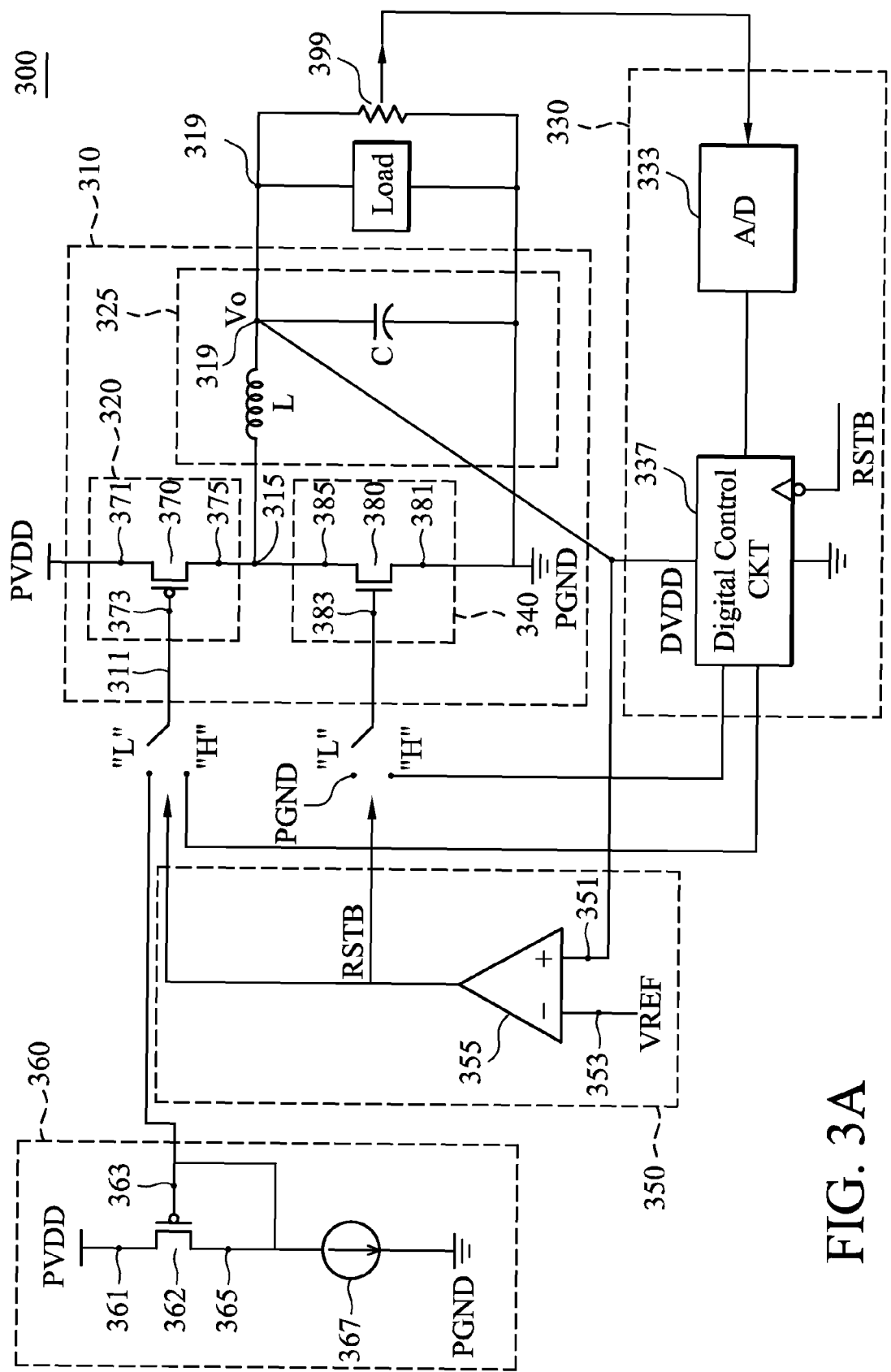
FIG. 3A is a schematic diagram of a DC-DC converter according to an embodiment of the invention.
Figure 3B:
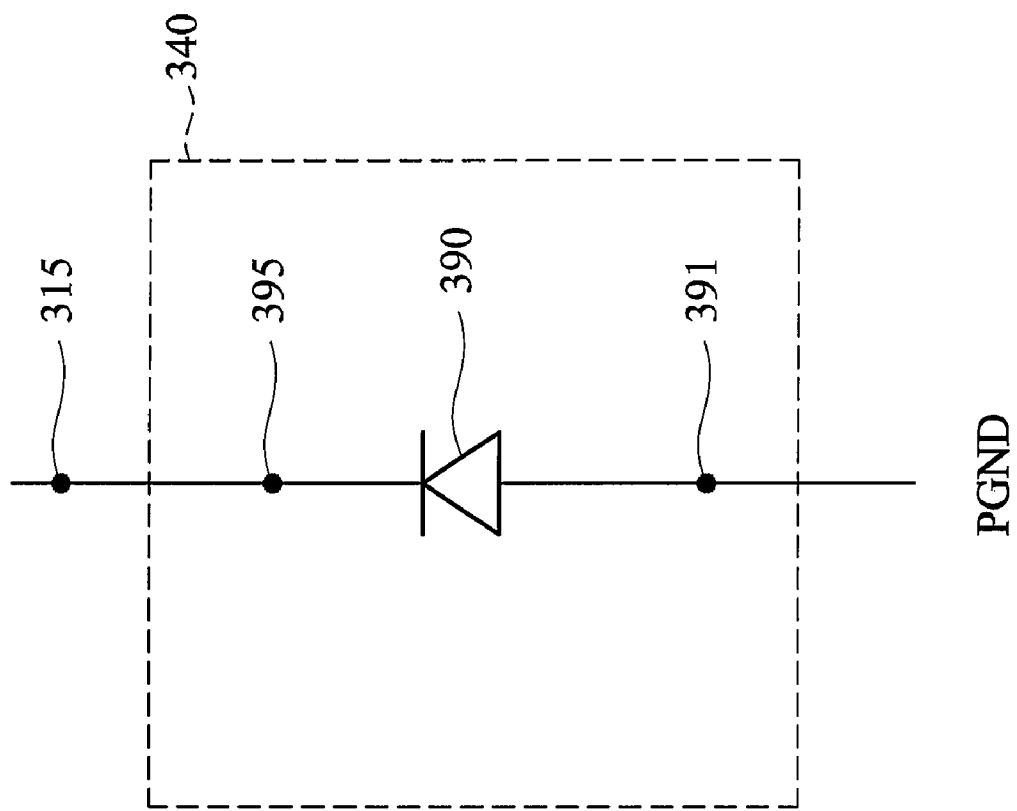
FIG. 3B is a schematic diagram of another embodiment of the pull-down circuit in FIG. 3A.

FIG. 3A is a schematic diagram of a DC-DC converter according to an embodiment of the invention. The DC-DC converter 300 comprises an output stage 310, a digital controller 330, and a controller 350. The output stage 310 comprises a pull-up circuit 320, a pull-down circuit 340, and a low pass filter 325. The pull-up circuit 320 has a control terminal 311 and is coupled between a first fixed voltage PVDD and an internal node 315. The pull-down circuit 340 is coupled between the internal node 315 and a second fixed voltage PGND. The low pass filter 325 is coupled between the internal node 315 and an output node 319. The output voltage Vo of the output node 319 is sampled by a voltage divider, such as a resistor 399 in FIG. 3. The digital controller 330 is powered by the DC output voltage Vo and coupled to the output node 319 via the voltage divider. The digital controller 330 controls the output stage 310 and thereby adjusts the DC output voltage Vo. The controller 350 controls the connection of a feedback path, comprising the digital controller 330, between the output node 319 and the control terminal 311 according to the DC output voltage Vo. Preferably, the pull-up circuit 320 is a PMOS transistor 370. The PMOS transistor 370 has a source 371 coupled to the first fixed voltage PVDD, a gate 373 coupled to the control terminal 311, and a drain 375 coupled to the internal node 315. In addition, the pull-down circuit 340 can be an NMOS transistor 380. The NMOS transistor 380 has a source 381 coupled to the second fixed voltage PGND, a gate 383 controlled by the controller 350 and a drain 385 coupled to the internal node 315. More specifically, the first and second fixed voltages are respectively a power supply voltage PVDD and a ground PGND. Alternatively, the pull-down circuit 340, as shown in FIG. 3B, can be a diode 390. The diode 390 has an anode 391 coupled to the second fixed voltage PGND and a cathode 395 coupled to the internal node 315.

In FIG. 3A, the controller 350 is a comparator 355. The comparator 355 has a non-inverting input terminal 351 receiving the DC output voltage Vo and an inverting input terminal 353 receiving a reference voltage VREF. The comparator 355 generates a control signal RSTB to selectively connect the control terminal 311 to the digital controller 330. Furthermore, the control signal RSTB can be transmitted to the digital control circuit 337 to control operation thereof. Preferably, the comparator 355 is a Schmitt trigger.

In the embodiment, the digital controller 330 comprises a digital control circuit 337, selectively coupled to the control terminal 311 of the pull-up circuit 320, and an A/D converter 333, coupled between the output node 319 and the digital control circuit 337. The low pass filter 325 comprises an inductor L, coupled between the internal node 315 and the output node 319, and a capacitor C, coupled between the output node 319 and the second fixed voltage PGND.

Additionally, the DC-DC converter 300 can further comprise a current control circuit 360. The current control circuit 360 is selectively coupled to the control terminal 311 of the pull-up circuit 320, controlling a current through the pull-up circuit 320. Preferably, the current control circuit 360 comprises a PMOS transistor 362 and a current source 367. The PMOS transistor 362 has a source 361 coupled to the first fixed voltage PVDD, a gate 363 selectively coupled to the gate 373 of the PMOS transistor 370 and a drain 365 coupled to the gate 363 of the PMOS transistor 362. The current source 367 is coupled between the drain 365 of the PMOS transistor 362 and the second fixed voltage PGND. More specifically, the first and second fixed voltages are respectively a power supply voltage PVDD and a ground PGND.

In the embodiment, alternative switching of the pull-up and pull-down circuits generates a pulse width modulation (PWM) signal at the internal node 315. The pulse width modulation signal is received and smoothed by the low pass filter 360. The PWM voltage fluctuations are significantly diminished by the low pass filter 360 and the smoothed PWM signal at the output node 319 is nearly a DC output voltage. The voltage level of the DC output voltage Vo is determined by a duty ratio of the PWM signal. The output voltage Vo of the output node 319 is sampled by the resistor 399. The A/D converter 333 receives and converts the sampled output voltage to a digital control code. The digital control circuit 337 receives the digital control code and controls switching of the pull-up and pull-down circuits according to the sampled output voltage. As a result, the duty ratio of the PWM signal is adjusted to adapt the DC output voltage Vo to a desired voltage level. The DC output voltage Vo powers the digital controller 330. No additional power source or low dropout regulator is required.

In addition, soft start of the DC-DC converter 300 is accomplished by the current control circuit 360. During startup of the DC-DC converter 300, RSTB is low because the output voltage Vo is lower than the reference voltage VREF, 1.6V for example. The digital control circuit 337 is initially kept in a reset state by the control signal RSTB and the loop is open. The pull-up circuit 320 and the current control circuit 360 are configured as a current mirror and the pull-down circuit 340 is open when RSTB is low. Since the current through the pull-up circuit 320 is controlled by the current mirror, the DC output voltage does not rise abruptly. The DC output voltage Vo slowly ramps up (soft start) until its level exceeds the reference voltage VREF. The control signal RSTB changes to high state when the DC output voltage Vo is higher than the reference voltage VREF. The high state of the control signal RSTB connects the pull-up and pull-down circuits to the digital control circuit 337. As a result, the reset state of the digital control circuit 337 is released by the high state of the control signal RSTB and the digital control circuit 337 starts closed loop operation.

When the DC-DC converter 300 is initially powered on, the feedback path (connection from node 399 to the control terminal 311 and the gate 383 via the digital controller 330) is not established. The control terminal 311 is connected to the current control circuits 360. The PMOS 370 and 362 form a current mirror in this embodiment and the current flowing through the PMOS 370 is controlled by the current mirror. The DC output voltage Vo is charged by the current flowing through the PMOS 370 and stably rises to a voltage that is enough to provide power to the digital controller 330. This is a soft-start process that prevents the DC output voltage Vo from overshooting.

Once the DC output voltage Vo is high enough (greater than VREF in this embodiment), the output of the comparator 355 changes from a low state to a high state, disconnecting the control terminal 311 from the current control circuits 360 and establishing a feedback path by connecting the control terminal 311 to the digital control circuit 337. Similarly, the gate 383 of the NMOS 380 is disconnected from PGND and switches to the digital control circuit 337. By connecting the gate 373 and 383 to the digital control circuit 337, the feedback path is established and the whole loop functions as a normal DC-DC converter using pulse width modulation.

Figure 4A:
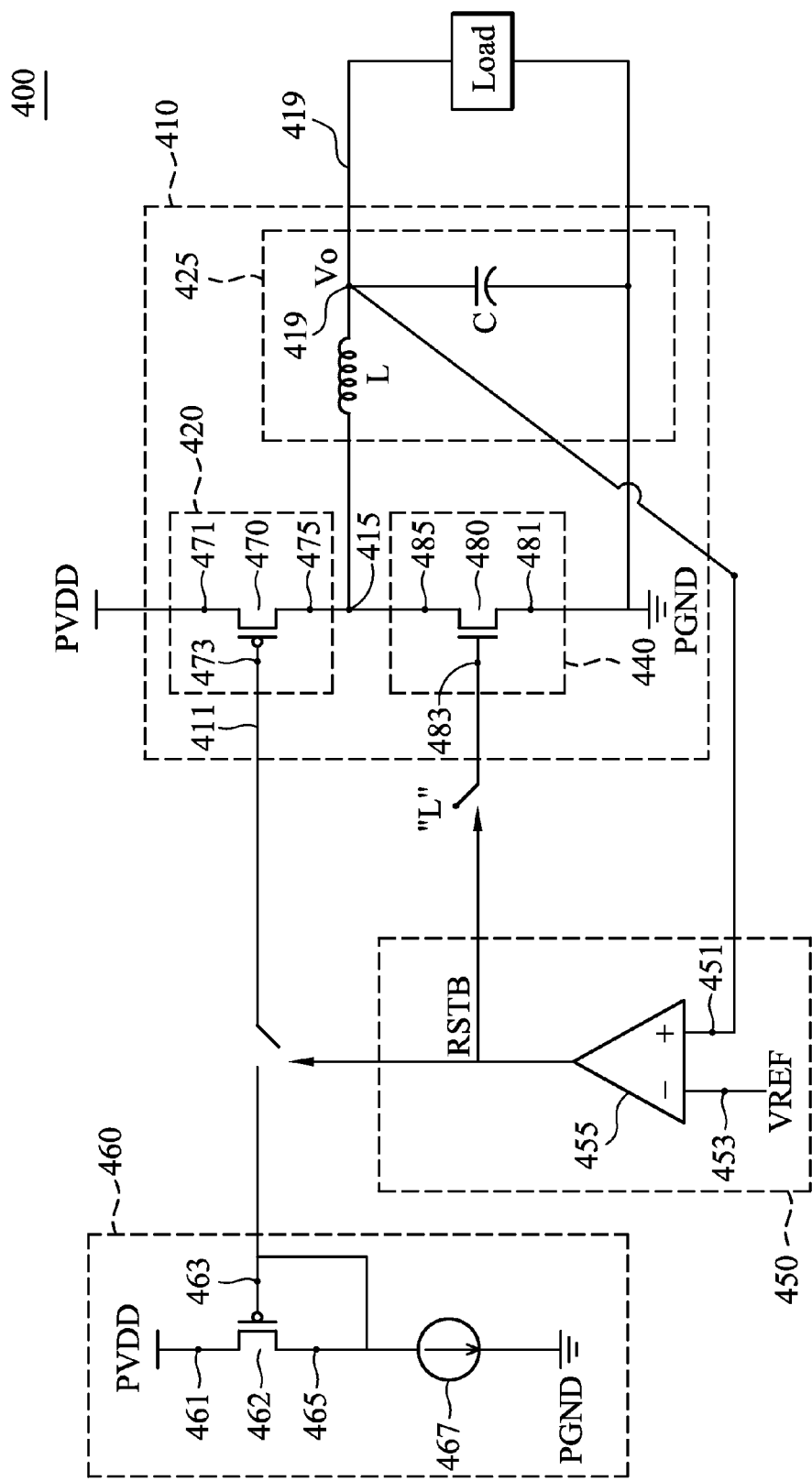
FIG. 4A is a schematic diagram of a DC-DC converter according to another embodiment of the invention.

FIG. 4A is a schematic diagram of a DC-DC converter according to another embodiment of the invention. The DC-DC converter comprises an output stage 410, a current control circuit 460, and a controller 450. The output stage 410 comprises a pull-up circuit 420, a pull-down circuit 440, and a low pass filter 425. The pull-up circuit 420 has a control terminal 411 and is coupled between a first fixed voltage PVDD and an internal node 415. The pull-down circuit 440 is coupled between the internal node 415 and a second fixed voltage PGND. The low pass filter 425 is coupled between the internal node 415 and an output node 419. Preferably, the low pass filter 425 comprises an inductor L, coupled between the internal node 415 and the output node 419, and a capacitor C, coupled between the output node 419 and the second fixed voltage PGND. The current control circuit 460 is selectively coupled to the pull-up circuit 411 and controls a current flowing through the pull-up circuit 420. The controller 450 selectively connects the current control circuit 460 to the pull-up circuit 420 according to the DC output voltage Vo. Preferably, the first and second fixed voltages are respectively a power supply voltage PVDD and a ground PGND.

In FIG. 4A, the controller 450 is a comparator 455. The comparator 455 has a non-inverting input terminal 451 receiving the DC output voltage Vo and an inverting input terminal 453 receiving a reference voltage VREF. The comparator 455 generates a control signal RSTB to selectively connect the pull-up circuit 420 to the current control circuit 460. Preferably, the comparator 455 is a Schmitt trigger.

In the embodiment, the pull-up circuit 420 is a first PMOS transistor 470 having a source 471 coupled to the first fixed voltage PVDD, a gate 473 coupled to the control terminal 411 and a drain 475 coupled to the internal node 415. The current control circuit 460 comprises a second PMOS transistor 462 and a current source 467. The second PMOS transistor 462 has a source 461 coupled to the first fixed voltage PVDD, a gate 463 selectively coupled to the gate 473 of the first PMOS transistor 470 and a drain 465 coupled to the gate 463 of the second PMOS transistor 462. The current source 467 is coupled between the drain 465 of the second PMOS transistor 462 and the second fixed voltage PGND.

Figure 4B:
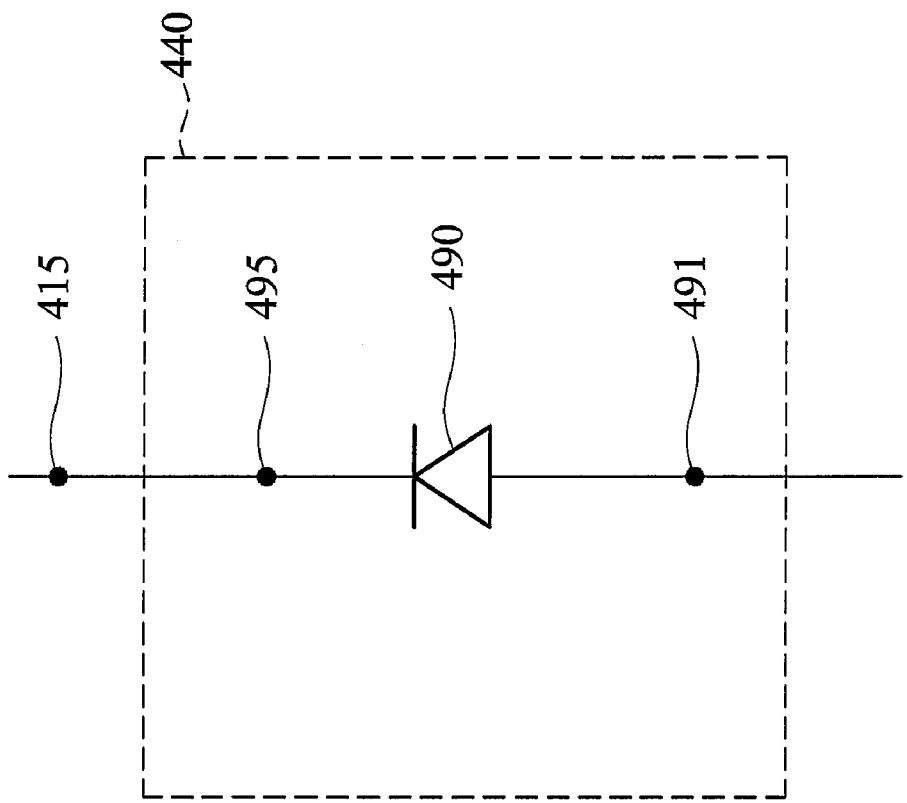
FIG. 4B is a schematic diagram of another embodiment of the pull-down circuit in FIG. 4A.

Additionally, the pull-down circuit 440 can be an NMOS transistor 480. The NMOS transistor 480 has a source 481 coupled to the second fixed voltage PGND, a gate 483 controlled by the controller 450 and a drain 485 coupled to the internal node 415. Alternatively, the pull-down circuit 440, as shown in FIG. 4B, can be a diode 490. The diode 490 has an anode 491 coupled to the second fixed voltage PGND and a cathode 495 coupled to the internal node 415.

When DC-DC converter 400 is initially powered on, Vo is low compared to the reference voltage VREF on terminal 453. The control signal RSTB is at a low state and connects the control terminal 411 to the gate 463. Transistors 462 and 470 form a current mirror and thus the current flowing through the transistor 470 is controlled. The DC output voltage Vo is charged by the current flowing through the PMOS 470 and stably rises to a wanted voltage. This is a soft-start process that prevents the DC output voltage Vo from overshooting.

While the invention has been described by way of example and in terms of preferred embodiment, it is to be understood that the invention is not limited thereto. To the contrary, it is intended to cover various modifications and would be apparent to those skilled in the art. Therefore, the scope of the appended claims should be accorded the broadest interpretation so as to encompass all such modifications.

What is claimed is:

1. A DC-DC converter, providing an output voltage at an output node, comprising:
   an output stage, comprising:
   a pull-up circuit having a control terminal and coupled between a first fixed voltage and an internal node;
   a pull-down circuit coupled between the internal node and a second fixed voltage; and
   a low pass filter coupled between the internal node and the output node;
   a digital controller, powered by the output voltage, adjusting the output voltage by controlling the output stage; and
   a controller controlling a connection of a feedback path according to the output voltage.

2. The DC-DC converter of claim 1, wherein the controller is a comparator receiving the output voltage and a reference voltage and generating a control signal to selectively connect the control terminal and the digital controller.

3. The DC-DC converter of claim 2, wherein the comparator is a Schmitt trigger.

4. The DC-DC converter of claim 1, wherein the digital controller comprises a digital control circuit and an A/D converter coupled between the output node and the digital control circuit.

5. The DC-DC converter of claim 1, wherein the pull-up circuit is a PMOS transistor having a source coupled to the first fixed voltage, a gate coupled to the control terminal and a drain coupled to the internal node.

6. The DC-DC converter of claim 1, wherein the pull-down circuit is an NMOS transistor having a source coupled to the second fixed voltage, a gate controlled by the controller and a drain coupled to the internal node.

7. The DC-DC converter of claim 1, wherein the pull-down circuit is a diode having an anode coupled to the second fixed voltage and a cathode coupled to the internal node.

8. The DC-DC converter of claim 1, wherein the low pass filter comprises an inductor coupled between the internal node and the output node and a capacitor coupled between the output node and the second fixed voltage.

9. The DC-DC converter of claim 1, wherein the first and second fixed voltages are respectively a power supply voltage and a ground.

10. The DC-DC converter of claim 1, further comprising a current control circuit, selectively coupled to the control terminal of the pull-up circuit, controlling a current through the pull-up circuit.

11. The DC-DC converter of claim 10, wherein the pull-up circuit is a first PMOS transistor having a source coupled to the first fixed voltage, a gate coupled to the control terminal and a drain coupled to the internal node, and the current control circuit comprises a second PMOS transistor, having a source coupled to the first fixed voltage, a gate selectively coupled to the gate of the first PMOS transistor and a drain coupled to the gate of the second PMOS transistor, and a current source coupled between the drain of the second PMOS transistor and the second fixed voltage.

12. A DC-DC converter for converting an input voltage into an output voltage, the DC-DC converter comprising:
   a pull up and pull down circuit;
   a low pass filter coupled to the pull up and pull down circuit;
   a digital circuit coupled between an output of the low pass filter and an control terminal of the pull up and pull down circuit, the digital circuit being a feedback path of the DC-DC converter; and
   a controller for selectively disconnecting the feedback path in response to the output voltage.

* * * * *